United States Patent [19]
Woodward

[11] Patent Number: 4,913,354
[45] Date of Patent: Apr. 3, 1990

[54] JET PIPE FOR JET PROPULSION IN AIRCRAFT

[75] Inventor: Clifford S. Woodward, Bristol, England

[73] Assignee: Rolls Royce plc, London, United Kingdom

[21] Appl. No.: 754,902

[22] Filed: Apr. 15, 1985

Related U.S. Application Data

[63] Continuation of Ser. No. 313,839, Oct. 20, 1981, abandoned.

[30] Foreign Application Priority Data

Oct. 31, 1980 [GB] United Kingdom ............... 8035125
Sep. 1, 1981 [GB] United Kingdom ............... 8126489

[51] Int. Cl.⁴ .............................................. B64C 15/04
[52] U.S. Cl. ................................. 239/265.35; 60/232
[58] Field of Search .................... 60/228, 230, 232; 239/265.35; 244/12.1, 12.4, 12.5, 23 D, 52

[56] References Cited

U.S. PATENT DOCUMENTS

| | | | |
|---|---|---|---|
| 3,300,977 | 1/1967 | Hoffman | 60/228 |
| 3,443,758 | 5/1969 | Kopp et al. | 60/232 |
| 3,485,450 | 12/1969 | Kurti | 60/232 |
| 3,525,475 | 8/1970 | Schweikl | 60/232 |
| 3,687,374 | 8/1972 | Nash | 60/232 |
| 3,776,467 | 12/1973 | Reimerschmid | 60/232 |
| 3,989,192 | 11/1976 | Enderle et al. | 60/232 |
| 4,281,795 | 8/1981 | Schweikl | 244/12.4 |

Primary Examiner—Donald P. Walsh
Attorney, Agent, or Firm—Oliff & Berridge

[57] ABSTRACT

A jet pipe for jet propulsion in aircraft has in flow-series a first or fixed duct 13, a second duct 14 and a third duct 15. The second duct 14 is supported on the first duct 13 for rotation about a common axis 13A, 14A of these two ducts. The third duct 15 is supported on the second duct 14 for rotation about an axis 19A having an angle oblique the axis 14A of the second duct. A ring 30 is supported on the second duct 14 for rotation about the axis 14A thereof. A bracket 31 mounted on the ring 30 has a guide and slide connection 32,33 with the third duct 15. A single drive shaft 24, mounted on the fixed duct 13, is connected to rotate the second duct 14 and the ring 30 in opposite directions. The guide and slide connection effects a corresponding rotation of the duct 15 about the axis 19A. The resulting relative rotation of the ducts 14,15 results in the duct 15 moving so that the axis 15A thereof moves through an angle β while remaining in a given plane 11A, 11B.

6 Claims, 3 Drawing Sheets

JET PIPE FOR JET PROPULSION IN AIRCRAFT

This is a continuation of application Ser. No. 313,839 filed Oct. 20, 1981 now abandoned.

This invention relates to jet pipes for jet propulsion in aircraft. More specifically the invention relates to jet pipes adapted for varying the direction of the jet relative to the aircraft, and being of the kind comprising, in flow-series, a first, a second and a third duct. the second duct is supported on the first duct for rotation relative thereto by a first bearing extending around the first and second ducts at the junction plane thereof. The third duct is supported on the second duct for rotation relative thereto by a second bearing extending around the second and third ducts at the junction plane thereof, wherein at least the second bearing has an axis of rotation oblique to the axis of the second duct so that if the second and third ducts are rotated one relative to the other, the direction of the axis of the third duct is varied relative to that of the first duct. Such a jet pipe is hereinafter referred to as being "of the kind described".

It is known from German Patent No. 2,019,205 to provide, in a jet pipe of the kind described, a drive system comprising a first driving member supported on the first duct and connected to the second duct for imparting thereto rotation thereto and, a second driving member supported on the first duct and connected to the third duct for imparting rotation thereto, the connection between the second drive member and the third duct including a ring supported on the second duct for rotation therearound and connected to be so rotated by the second driving member. This known drive system is intended to provide for universal movement of the third duct relative to the first duct and the connection between the second drive member and the third duct includes an epicyclic gearing which accommodates angular movement of the third duct independently of the second duct.

It is possible, in the known drive system, to rotate the second and third ducts in opposite directions in such a way that the axis of the third duct remains in a given plane during any change in the direction of that axis. Such planar movement requires that the respective rotations of the second and the third duct take place at the same rate about the axis of the second bearing. However, the angle between the axes of the second and third ducts has the effect that, to satisfy the latter requirement, the rotation of the second and third ducts about their respective axes has to take place at dissimilar rates. In the known drive system this could be accomplished only by different rates of rotation of the first and second driving members. Such an arrangement had disadvantages from the control point of view. It is an object of the invention to reduce or overcome those disadvantages.

According to this invention there is provided a jet pipe for jet propulsion in aircraaft, comprising a first, a second and a third duct, all connected in flow-series. The second duct is supported on the first duct for rotation relative thereto by a first bearing extending around the first and second ducts at the junction plane thereof. The third duct is being supported on the second duct for rotation relative thereto by a second bearing extending around the second and third ducts at the junction plane thereof. At least the second bearing has an axis of rotation oblique to the axis of the second duct so that if the second and third ducts are rotated one relative to the other, the direction of the axis of the third duct is varied relative to that of the first duct. A single driving member is supported for rotation on the first duct, first transmission means is connected between the driving member and an associated driven member being said second duct, and second transmission means is connected between the driving member and an associated driven member being said third duct. One of said transmission means is adapted to drive its associated driven member in the same direction as the driving member, while the other one of said transmission means is adapted to drive its associated driven member in a direction opposite to that of the driving member. One of said transmission means includes varying means for varying the transmission ratio of the latter transmission means relative to that of the other transmission means so that the axis of the third duct remains in a given plane during variation in the direction of the latter axis.

The invention has the advantage of a single driving member, e.g. a single motor-driven shaft, the requirement for different rates of rotation of the second and third ducts about their respective axes being satisfied by the inclusion of said varying means in at least one of the transmission means.

An example of a jet pipe according to this invention will now be described with reference to the accompanying drawings wherein.

Figure 1:
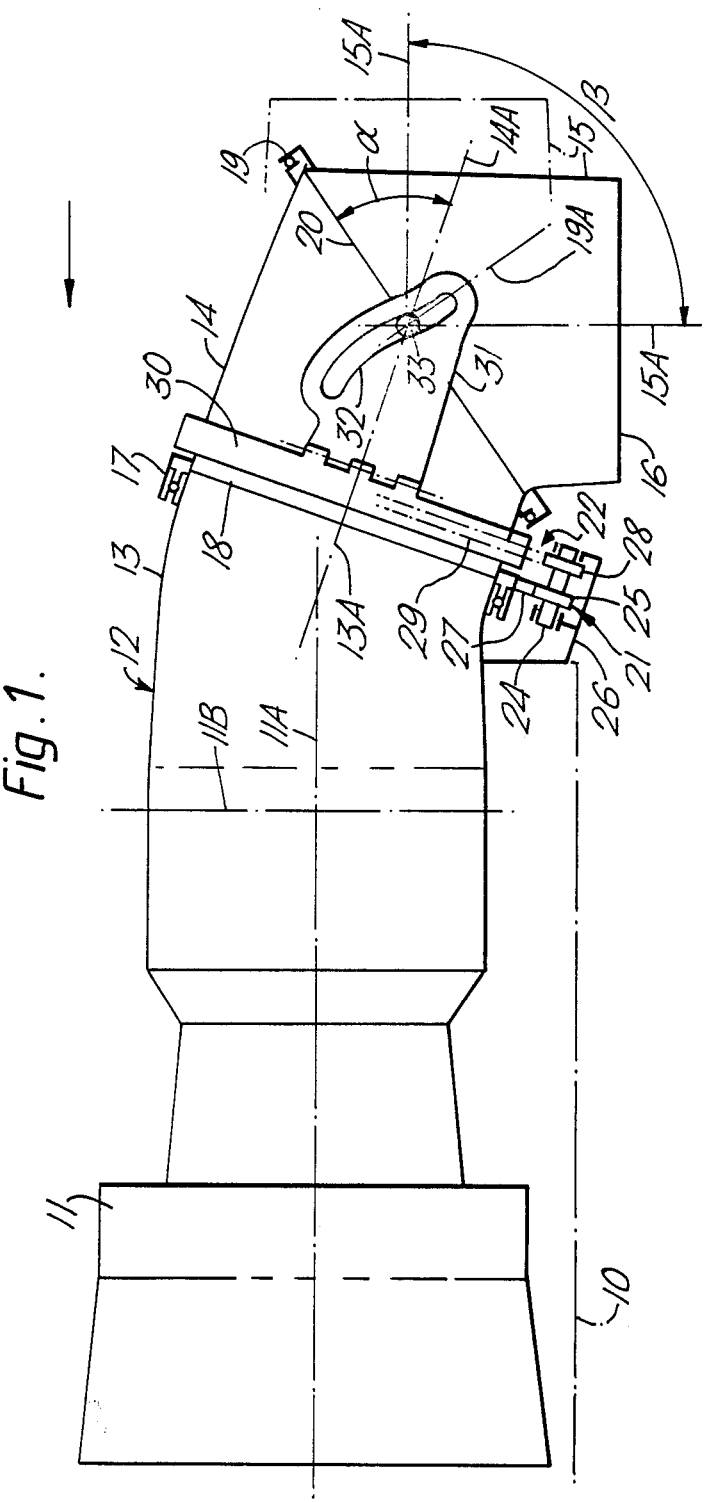
FIG. 1 is a side elevation of a gas turbine engine embodying the jet pipe.

Referring to FIG. 1, an aircraft fuselage 10 has mounted therein a gas turbine engine 11 having a jet pipe 12 comprising in flow-series a first or upstream duct 13, a second or intermediate duct 14 and a third or downstream duct 15, the latter embodying a nozzle 16 for exhaust of the propulsive fluid. The second duct 14 is supported on the first duct 13 for rotation relative thereto by an annular first bearing 17 extending around the ducts 13,14 at the junction plane 18 of these ducts. The third duct 15 is supported on the second duct 14 for rotation relative thereto by a second annular bearing 19 extending around the ducts 14,15 at the junction plane 20 thereof. The annuli of the bearing 17 and 19 lie nominally in the planes 18 and 20 respectively. The second duct 14 has an axis 14A in common with the axis of rotation of the bearings 17 and of course normal to the plane 18. The plane 20 lies at an angle $\alpha$ to the axis 14A and the bearing 19 accordingly has an axis 19A oblique to the axis 14A.

The duct 15 has an axis 15A defining the direction of thrust of the engine 11. The latter has a main axis 11A having a fixed relationship to the axis, 13A, of the duct 13.

When the duct 14 is rotated about the axis 14A and the duct 15 is rotated about the axis 19A in the opposite direction, the duct 15 is moved in such a way that the axis 15A thereof moves through an angle $\beta$ from a position of near parallelism with the axis 11A when the thrust on the aircraft is predominantly forwards to a position more nearly at right angles to the axis 11A when the thrust will be predominantly upwards.

The rotation of the ducts 14,15 is effected by a drive system comprising a single driving member being a shaft 24, supported by a bearing 26 secured to the duct 13. The shaft 24 is connected to the duct 14 by a transmission means 21 comprising a driving gear 25 secured to the shaft 24 annd meshing with a driven gear 27 secured to the duct 14. Further, the shaft 24 is connected to the duct 15 by a transmission means 22 comprising a driving sprocket 28 secured to the shaft 24 and connected by a chain 29 to a driven sprocket (not shown) secured to a ring 30 supported on the duct 14 for rotation relative thereto about the axis 14A. The ring 30 is connected to the duct 15 by an elongate guide being a bracket 31 mounted on the ring 30 and having a track 32 engaged by a follower or slide 33 secured to the duct 15 in a position adjacent the bearing 19.

When the gear 25 and driving sprocket 28 are rotated, as by a motor (not shown) the duct 14 and ring 30 are rotated at like angular velocities in opposite directions, the ring 30 transmitting its rotation to the duct 15 through the track 32 and slide 33. The resulting opposite rotation of the ducts 14,15 and the oblique position of the bearing axis 19A result in the change in the angular position of the duct 15 through the angle $\beta$.

Figure 2:
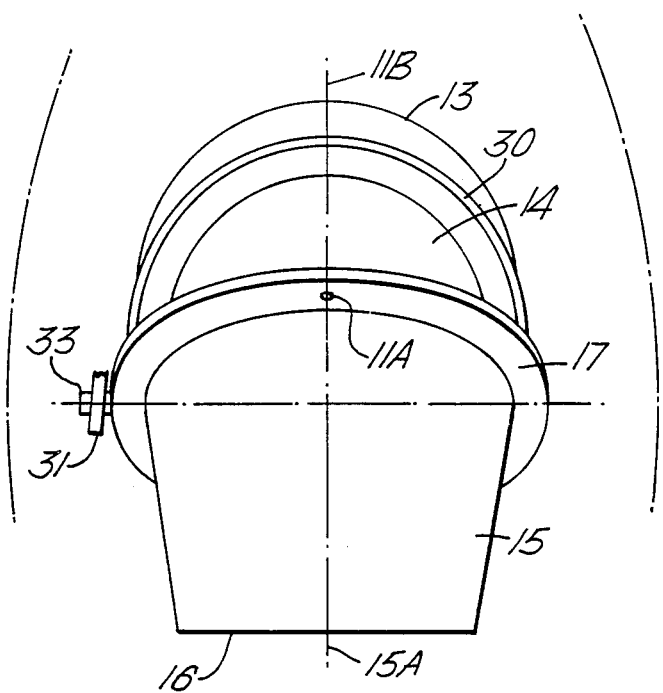
FIG. 2 is a view in the direction of the arrow II in FIG. 1.
Figure 3:
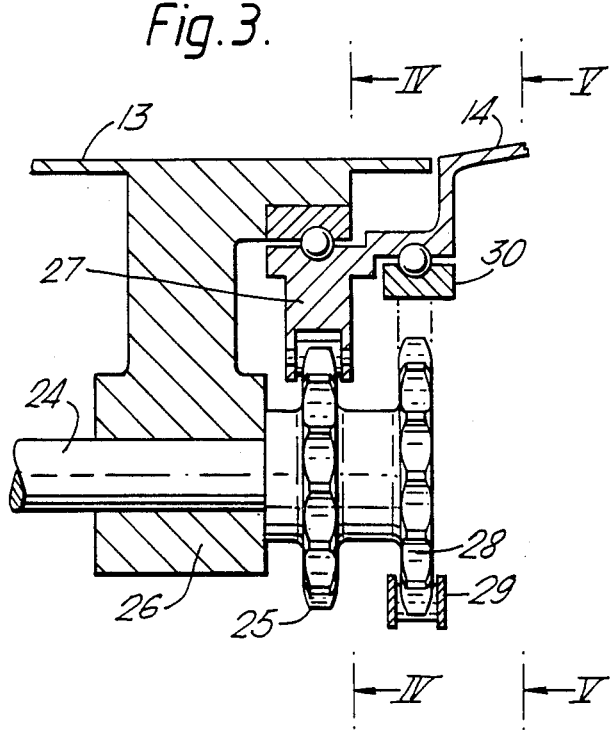
FIG. 3 is an enlarged detail of FIG. 1.
Figure 4:
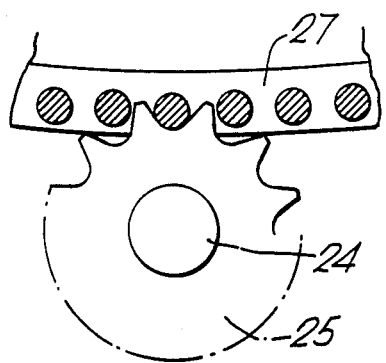
FIG. 4 is a section on the line IV-IV in FIG. 3.
Figure 5:
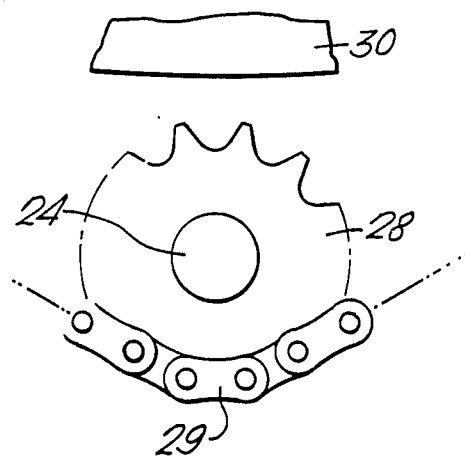
FIG. 5 is a section on the line V-V in FIG. 3.

The arrangement is required to be such that during movement of the duct 15 the thrust line of the engine, as defined by the axis 15A, remains in a plane lying on the axis 11A and a reference axis 11B (FIGS. 1 and 2) perpendicular thereto. This plane is the plane of symmetry of the aircraft and the thrust line is required to lie in this plane to avoid yaw forces on the aircraft when the thrust line is changed between the forward and upward thrust positions. The requirement for planar movement is satisfied if the respective rates of rotation of the ducts 14,15 are the same about the axis 19A of the bearing 19. However, because of the fact that the ring 30 and the duct 15 do not rotate about parallel axes, the track 32 is curved so that the rate of rotation of the duct 15 about the axis 19A becomes the same as the rate of rotation of the duct 14 about the axis 13A.

As shown in FIG. 1, the track 32 may be in the shape of an S-curve, with the bracket 31 connected to the ring 30 by means of a hinge 34 to ensure that the follower 33 stays in the track 32 during relative motion between duct 14 and duct 15 to keep the movement of the axis 15A within the plane defined by axes 11A and 11B.

I claim:

1. Jet pipe for jet propulsion in aircraft, comprising:
a first, a second and a third duct, all connected in flow-series, the second duct being supported on the first duct for rotation relative thereto by a first bearing extending around the first and second ducts at a junction plane thereof, the third duct being supported on the second duct for rotation relative thereto by a second bearing extending around the second and third ducts at a junction plane thereof, at least the second bearing having an axis of rotation oblique to the axis of the second duct so that if the second and third ducts are rotated relative to each other, the direction of the axis of the third duct is varied relative to that of the first duct;

a single driving member supported for rotation on the first duct;

first transmission means connected between the driving member and an associated driven member being said second duct;

second transmission means connected between the driving member and an associated driven member being said third duct;

one of said transmissin means being adapted to drive its associated driven member in the same direction as the driving member, the other one of said transmission means being adapted to drive its associated driven member in a direction opposite to that of the driving member; and said second transmission means including varying means for varying the transmission ratio of one of said second transmission means relative to that of the first transmission means so that the axis of the third duct remains in a given plane during variation in the direction of the axis of the third duct.

2. Jet pipe according to claim 1, wherein the second transmission means comprises a ring extending around the second duct and supported thereon for rotation about the axis thereof, the single drive member is connected to rotate the ring, and the ring is connected to drive the thrid duct.

3. Jet pipe according to claim 2 wherein said varying means are provided in the connection between said ring and the third duct.

4. Jet pipe according to claim 3 wherein the varying means comprise a track and follower means connected between the ring and the third duct.

5. Jet pipe according to claim 4 wherein said track has the shape of an S-curve.

6. Jet pipe according to claim 4 wherein said track is provided in a bracket hingedly connected to the ring and the follower means is connected to the third duct.

* * * * *